United States Patent [19]
Fahimi et al.

[11] Patent Number: 6,122,147
[45] Date of Patent: Sep. 19, 2000

[54] NEGATIVE PRESSURE HEAD CONTOUR IN A LINEAR TAPE RECORDING SYSTEM WITH TAPE DEFORMING CAVITY

[75] Inventors: A. Saeed Fahimi, Bloomington; Theodore A. Schwarz, Woodbury, both of Minn.

[73] Assignee: Imation Corp., Oakdale, Minn.

[21] Appl. No.: 09/225,281

[22] Filed: Jan. 5, 1999

[51] Int. Cl.$^7$ .................................................. G11B 15/60
[52] U.S. Cl. ..................................... 360/221; 360/130.21
[58] Field of Search ............................... 360/221, 130.21

[56] References Cited

U.S. PATENT DOCUMENTS

| | | |
|---|---|---|
| 3,573,769 | 4/1971 | Flora . |
| 3,643,037 | 2/1972 | Norwood .............................. 360/221 |
| 3,872,507 | 3/1975 | Sano et al. . |
| 4,706,146 | 11/1987 | Dohmen et al. . |
| 4,901,179 | 2/1990 | Satomi et al. . |
| 4,956,737 | 9/1990 | Brock . |
| 5,751,527 | 5/1998 | Sundaram et al. . |
| 5,781,383 | 7/1998 | Strand . |

OTHER PUBLICATIONS

"The Self–Acting, Subambient Foil Bearing in High Speed, Contact Tape Recording with a Flat Head," Muftu et al., *Tribology Transactions*, vol. 41 (1998), 1, pp. 19–26.

"Contact Tape Recording with a Flat Head Contour," Hinteregger et al., *IEEE Transactions on Magnetics*, vol. 32, No. 5, Sep. 1996, pp. 3476–3478.

*Primary Examiner*—A. J. Heinz
*Attorney, Agent, or Firm*—Eric D. Levinson

[57] ABSTRACT

A magnetic head assembly in a linear tape system having an interface region having a substantially flat region with a substantially square leading edge and at least one cavity in the flat region. The cavity has a depth of about 0.5 micrometers to about 20 micrometers. At least one read-write element is located on the flat region adjacent to the cavity. As a magnetic tape traversing the interface region, a sub-ambient condition is generated. The magnetic tape is bent or otherwise deformed as it passes over the cavity, thereby increase tape stability at the interface with the read-write elements. A magnetic tape system for recording, reproducing and/or erasing magnetic information in a linear tape system or for servo-writing magnetic tapes is also disclosed.

25 Claims, 12 Drawing Sheets

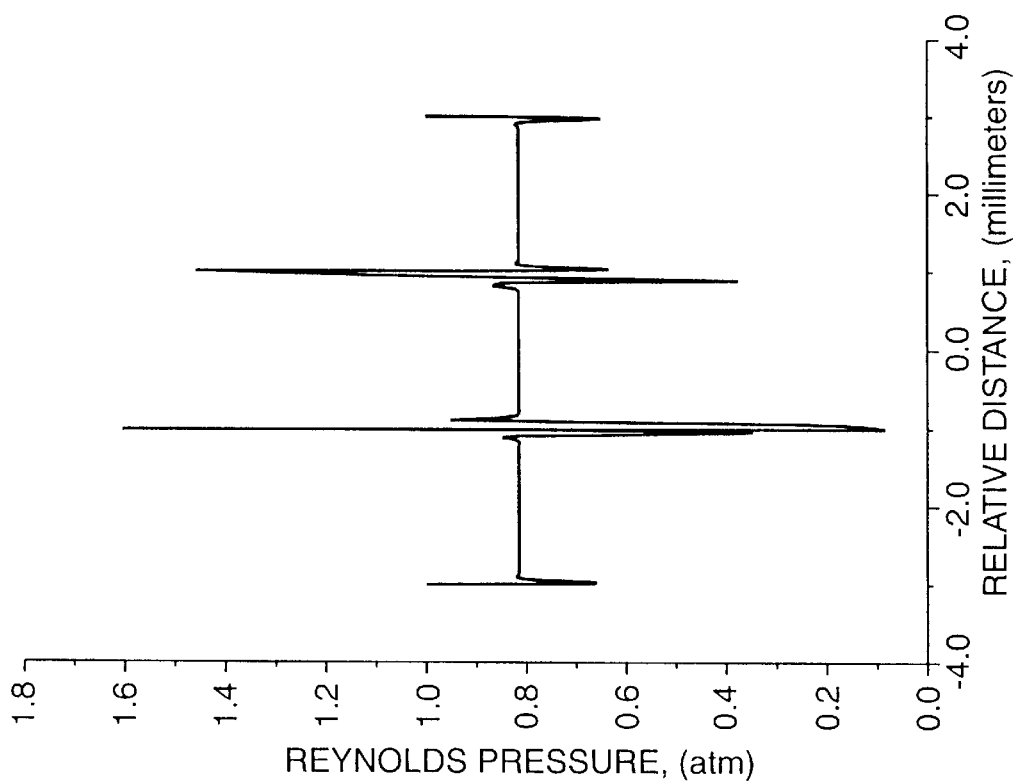
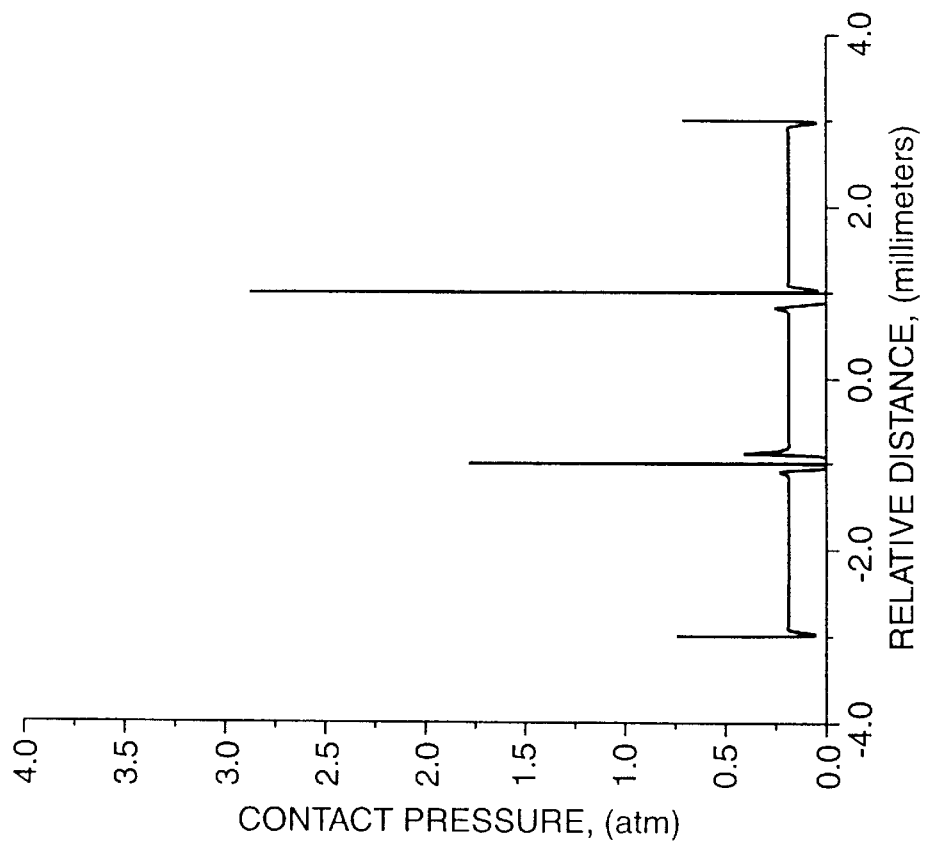

NEGATIVE PRESSURE HEAD CONTOUR IN A LINEAR TAPE RECORDING SYSTEM WITH TAPE DEFORMING CAVITY

This invention was made with Government support under the Cooperative Agreement No. 70NANB5H1 16 awarded by the National Institute of Standards and Technology (NIST). The Government has certain rights in this invention.

FIELD OF THE INVENTION

The present invention is directed to a magnetic head assembly for reading, reproducing and/or erasing magnetic information in a track of a flexible magnetic tape, and in particular, to a flat-top negative pressure head contour having a cavity that utilizes the bending force of the tape to achieve stable head-to-tape spacing.

BACKGROUND OF THE INVENTION

The trend in the magnetic recording art is toward higher capacity, higher transfer rate, faster access, and increased system bandwidth through the recording and playback of shorter and shorter wavelength signals. This trend necessitates intimate contact at the interface between the magnetic head and the recording medium.

In order to obtain optimum performance in writing to and reading from magnetic tape, it is necessary that the moving tape be kept in close and stable proximity to the magnetic head. As the head-to-tape separation or flying height increases, performance deteriorates. The primary consequences of a higher tape flying height are a decrease in read amplitude and an upward shift in the peak write current. Conversely, the read amplitude increases as the flying height decreases. Therefore, an increase in tape head performance can be obtained by minimizing flying height.

The magnetic head contour is typically cylindrical. At higher tape speeds, an air layer adherent to the moving tape becomes entrained between the magnetic head and the tape surface traversing the head, causing the magnetic tape to "fly" over the head. The entrained air acts as an air bearing, lifting the tape from the head contour and separating the recording medium from the interface, with resultant signal degradation.

Intimate contact between the tape and the magnetic head at the interface is typically increased by a combination of greater tape tension across the magnetic head and more penetration of the magnetic head into the tape. Another approach to minimizing flying height on cylindrical magnetic heads is to incorporate bleed slots. Bleed slots are grooves in the contour surface. As the tape moves across the head, the bleed slots help to channel entrained air away from the head-to-tape interface, thus reducing the height distribution of the layer of air. Thus, bleed slots function in a manner that is analogous to treads on a tire. Just as the tire treads help to channel water away from the tire surface to prevent hydroplaning, bleed slots help to channel away air from the head contour surface to minimize head-to-tape separation.

An optimized head contour design is typically based on a cylindrical surface having a radius of curvature of about 4 to about 8 millimeters and air bleed grooves, either longitudinally or transversally, to maintain minimal head-to-tape spacing. In a typical head-to-tape interface, head-to-tape penetration of about 3 to about 5 millimeters in combination with about 80 to about 120 Newtons per meter of tape tension to create adequate downward force to achieve close head-to-tape spacing. However, these conditions can lead to increased head wear and tape damage. Excessive wear may result in either alterations of the head profile or erosion of the gap in the case of thin film heads.

For example, after prolonged usage, an undulating wear profile is typically created on the magnetic head in a direction perpendicular to the motion of the magnetic tape. This profile is due to the non-uniformity in the head-to-tape separation across the tape. In other words, the flying height of the tape varies from point to point across the tape. At points of low flying height, wear of the head is more pronounced than at points of greater flying height.

FIG. 1A is a schematic illustration of a plain flat magnetic head 20 with the read-write elements 22 located in a flat region 24, as generally set forth in Hinteregger et al., *Contact Tape Recording with a Flat Head Contour*, IEEE Transactions on Magnetics, Vol. 32, No. 5, Pg. 3476, September 1996. The configuration of FIG. 1A generates a region of sub-ambient pressure at the interface 26 of the tape 28 moving in the direction 29 and the flat surface 24. FIG. 1B is a graphical illustration of the pressure at the interface 26 across the length of the magnetic head 20. Air is entrained by the tape 28 at the leading edge 30 of the magnetic head 20, such that the head-to-tape spacing has a slightly diverging shape 32. Consequently, the air pressure in the region 32 is sub-ambient, as illustrated in FIG. 1B. The air expands in the region 32 between the tape 28 and the flat region 24 and creates suction under the tape 28. The air pressure remains generally constant and sub-ambient and the head-to-tape spacing is remains generally constant across the remainder of the flat region 24.

The highest contact pressure occurs at the leading edge 30 of the magnetic head 20. With low wrap angles, typically in the range of about 2° and reduced tape tension, the center region 34 of the tape 28 can be subject to instability due to tape flutter. This instability is sensitive to variations in tape speed and tape tension. Instability in the tape 28 in the center region 34 can increase wear on the read-write elements 22 and degrade electrical performance of the magnetic head 20.

BRIEF SUMMARY OF THE INVENTION

The present negative pressure head contour is less sensitive to tape speed and tape tension while maintaining a substantially uniform tape-to-head spacing over a large flat region on the magnetic head. The downward force needed to maintain the interface between the tape and the present negative pressure head contour is generated primarily by a sub-ambient air bearing and the bending force of the tape, rather than a combination of head penetration and tape tension. The air bearing pressure is sub-ambient across substantially all of the magnetic head, which pulls the tape down to the magnetic head at the interface region. A bending force on the tape created in the cavity adjacent to the read-write elements minimizes instability at the interface, even at high tape speeds. Since the tape tension and head penetration are no longer needed to create the desired head-to-tape spacing, these parameters can be minimized, resulting in reduced head wear and tape damage.

The present invention is directed to a magnetic head assembly in a linear tape system with an interface region having a substantially flat region, a substantially square leading edge and at least one cavity in the flat region. In one embodiment, the cavity has a depth of between about 0.5 micrometers to less than about 20 micrometers. At least one read-write element is located on the flat region adjacent to the cavity. A self-generating sub-ambient condition is created by the movement of the tape over the interface region. The magnetic tape is bent or otherwise deformed into the cavity as it passes over the magnetic head assembly, thereby increasing tape stability in the interface region, and therefore, at the interface with the read-write elements.

In another embodiment, the interface region has a substantially flat region with a substantially square leading edge and a pair of cavities in the flat region. The cavity has a depth of between about 0.5 micrometers to less than about 20 micrometers. At least one read-write element is located on the flat region between the pair of cavities, whereby the magnetic tape generates a sub-ambient condition when traversing the interface region, including the cavity. The magnetic tape is deformed as it passes over each of the cavities, thereby increasing tape stability at the interface with the read-write elements.

Magnetic tapes are inherently abrasive and cause wear in the recording heads. Head wear can be severe at high tape speeds if the contour of the head is not properly designed. The present negative pressure head contour provides relatively high contact pressure at the edges of the magnetic head and moderate contact pressure at the read-write elements, where the magnetic performance is influenced the most by wear. Consequently, there is less wear at the read-write elements. Harder materials can be used to reinforce the edges of the magnetic head to maintain head geometry. The hard contact at the edges provides the additional benefit of working as scrapers to reduce the introduction of debris into the read-write gap.

In addition to the low wear characteristics, the present negative pressure head contour provides self-balancing force (upward and downward) at a wide range of tape speeds and tape tensions. This phenomenon reduces the influence of tape speed and tape tension on head-to-tape spacing during all phases of operation, including startup and shut-down. For example, the head-to-tape spacing, contact pressure and Reynolds pressure at the interface with the read-write element is substantially constant at tape speeds of about 4 meters/second to at least 12 meters/second. In another embodiment, the tape maintains asperity contact with the read-write element at tape tensions of less than about 40 Newtons/meter, and preferably less than 20 Newtons/meter at a tape speed of at least about 4 meters/second. Asperity contact refers to at least some light physical contact of the tape on the read-write elements.

The interface between the read-write elements and the tape occurs on the flat region, similar to a rigid disk configuration. A multi-channel head design of the present negative pressure head contour can be constructed using rigid disk head technology. Due to the simplicity of this design, the head can be manufactured easily with tight tolerances on flatness, roughness, and overall geometry. The leading and trailing edges of the magnetic head act as scrapers due to the high contact pressure to minimize the migration of particles into the interface region. Additionally, the cavity adjacent to the read-write elements can serve as a collection point for debris at the interface.

In the illustrated embodiment, the head contour is designed to be symmetrical with respect to the head center line in order to be used for both single direction and bi-directional recording applications. The head contour can be adapted to various tape widths and number of read-write gaps with minor changes.

The present invention is also directed to a magnetic tape system for recording, reproducing and/or erasing magnetic information in a linear tape system or for servo-writing magnetic tapes.

BRIEF DESCRIPTION OF THE SEVERAL VIEWS OF THE DRAWING

FIG. 6A is a graphical illustration of contact pressure across the length of a negative pressure head contour in accordance with the present invention.

FIG. 6B is a graphical illustration of Reynolds pressure across the length of a negative pressure head contour in accordance with the present invention.

DETAILED DESCRIPTION OF THE INVENTION

Figure 1A:
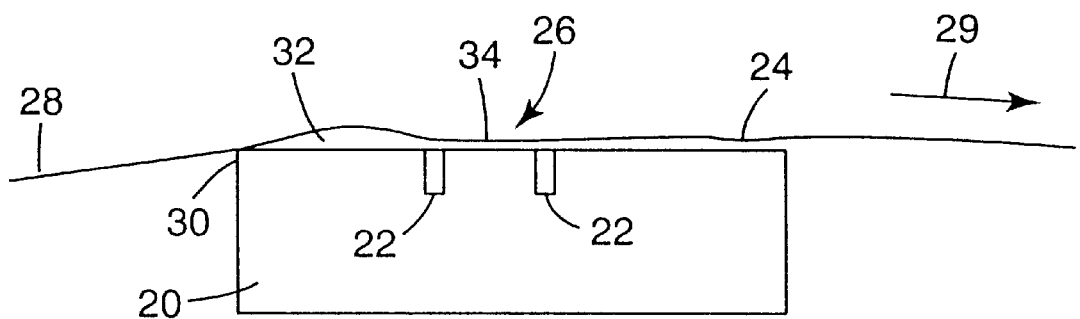
FIG. 1A is a schematic illustration of a prior art flat head contour.
Figure 1B:
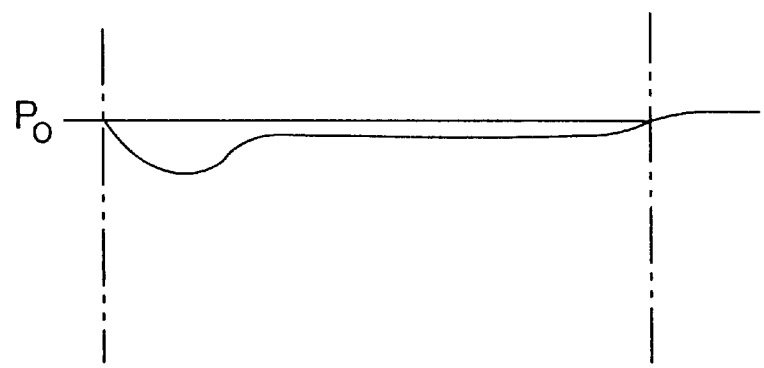
FIG. 1B illustrates the air pressure under the tape along the head of FIG. 1A.
Figure 2A:
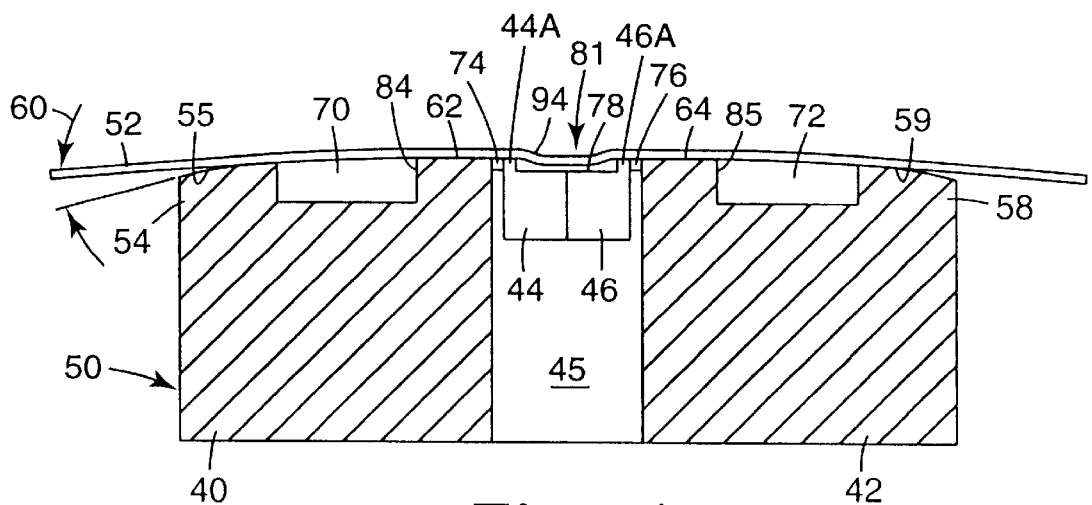
FIG. 2A is a cross sectional view of a negative pressure head contour in accordance with the present invention.
Figure 3:
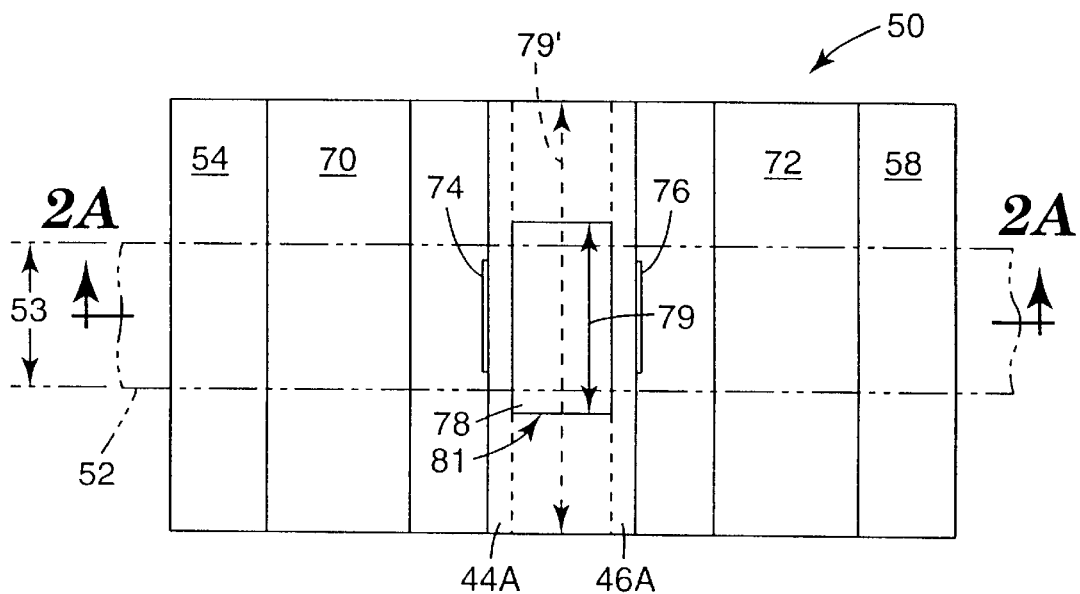
FIG. 3 is a top view of the negative pressure head contour of FIG. 2A.

FIGS. 2A and 3 illustrate various views of a magnetic head assembly 50 for recording, reproducing and/or erasing magnetic information in a track of a flexible magnetic tape 52 in accordance with the present invention. The magnetic head assembly includes a first substrate 40 upon which a thin film magnetic read-write element 74 is deposited. A closure piece 44 is bonded to the first substrate. A second substrate 42 with a thin film magnetic read-write element 76 and closure piece 46 is positioned adjacent to the first substrate 40. The closure pieces 44, 46 each include raised portions 44A, 46A, respectively. The closure pieces 44, 46 form an open region 45 that permits access to the read-write elements 74, 76 from behind the magnetic head assembly 50.

The first substrate 40 includes an outrigger 54, a bleed slot 70 and a flat region 62. The second substrate 42 includes an outrigger 58, a bleed slot 72 and a flat region 64. The leading edges 84, 85 of the flat regions 62, 64, respectively, are substantially square. In the illustrated embodiment, the flat regions 62, 64 also include the raised portions 44A, 46A of the closure piece 44, 46, respectively. The substrates 40, 42 are bonded with the closure pieces 44, 46 so that the flat regions 62, 64 and raised portions 44A, 46A form a flat, co-planar surface. The closure pieces 44, 46 define a cavity 78 that is adjacent to the read-write elements 74, 76.

The flat regions 62, 64, 44A, 46A, the read-write elements 74, 76 and the cavity 78 define an interface region 81 extending between the edges 84, 85. A self-generating sub-ambient condition across the interface region 81 is caused by movement of the tape 52. The sub-ambient condition causes the tape 52 conforms slightly to the cavity 78 as it traverses the read-write elements 74, 76. The slight deformation or bending 94 in the tape 52 provides structural integrity to resist flutter and other instability along the interface region 81 of the magnetic head 56.

The outriggers 54, 58 establish a wrap angle 60 of the magnetic tape 52 across the flat regions 62, 64 of the magnetic head 56. In order to minimize head penetration into the magnetic tape 52, the outriggers 54, 58 preferably maintain a wrap angle in the range of about 1° to about 5°. The surfaces 55, 59 of outriggers 54, 58, respectively, have a radius of about 6 millimeters to about 8 millimeters. The bleed slots are typically at least about 0.1 millimeters (0.004 inches) deep so that air pressure above and below the magnetic tape 52 is substantially at ambient in those regions.

Figure 2B:
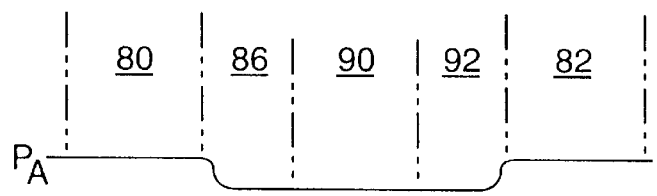
FIG. 2B illustrates the pressure profile under the tape along the length of the head of FIG. 2A.

FIG. 2B is a graphical illustration of the air pressure profile between the magnetic tape 52 and the magnetic head assembly 50. Due to the depth, length and width of the bleed slots 70 and 72, the air pressure below the tape 52 is generally at ambient (designated PA) in the regions 80, 82 respectively. Air entrained at the bottom of the magnetic tape 52 is obstructed at the edge 84 of the flat region 62 (or edge 85 of flat region 64, depending upon the direction of tape travel since the magnetic head assembly 50 is preferably bi-directional). This phenomenon creates a reduced pressure condition in the region 86 corresponding to the flat region 62. Since the cavity 78 is relatively shallow, the reduced pressure condition continues through the cavity region 90. The negative pressure condition is maintained in the flat region 64 corresponding to the region 92. The self-generating sub-ambient condition is created across the regions 86, 90, 92 by movement of the tape. Finally, as the magnetic tape 52 progresses to the bleed slots 72, an ambient condition is re-established both above and below the tape 52.

The contact pressure in the cavity region 90 illustrated in FIG. 2B is generally in the same range as that illustrated in the adjacent flat region 62, 64, illustrated as regions 86, 92. It is possible that the contact pressure in the cavity region 90 may be slightly greater than or less than that in the adjacent flat regions 62, 64, so long as all three regions 86, 90, 92 are sub-ambient. The magnitude of the sub-ambient condition must be sufficient to deform or bend the tape 52 as it traverses the cavity 78. Variations in the contact pressure and the cavity region 90 can be achieved by changing the depth or width of the cavity 78.

In the illustrated embodiment, each of the flat regions 62, 64 typically have a length measured in the direction of tape travel of about 0.5 millimeters to about 3 millimeters. The cavity 78 has a length measured in the direction of tape travel of about 0.5 millimeters to about 2 millimeters. The cavity 78 preferably has a depth of at least 0.5 micrometers to about 20 micrometers or less, and more preferably about 0.5 micrometers to about 5 micrometers and most preferably about 0.5 micrometers to about 3 micrometers.

As best illustrated in FIG. 3, the cavity 78 may have a width 79 measured in a direction perpendicular to the direction of tape travel less than, greater than or equal to the width 53 of the tape 52. Alternatively, the cavity 78 may have a width 79' extending across the fill width of the magnetic head assembly 50 (shown in dashed lines). Since the cavity 78 is extremely shallow, the sub-ambient condition is maintained across the interface region 81 even if the cavity 78 has a width less than, greater than or equal to the width 53 of the tape 52. The read-write elements 74, 76 typically have a width less than the width 53 of the magnetic tape 52. The leading edges 84, 85 of the flat regions 62, 64, respectively, are preferably constructed of a extremely hard material, such as Al—TiC ($Al_2O_3$—TiC). The flat regions 62, 64 preferably have a flatness of less than about 100 nanometers and a surface roughness of less than about 100 nanometers RMS. The entire interface region 81 preferably has a flatness of less than about 100 nanometers.

Figure 4:
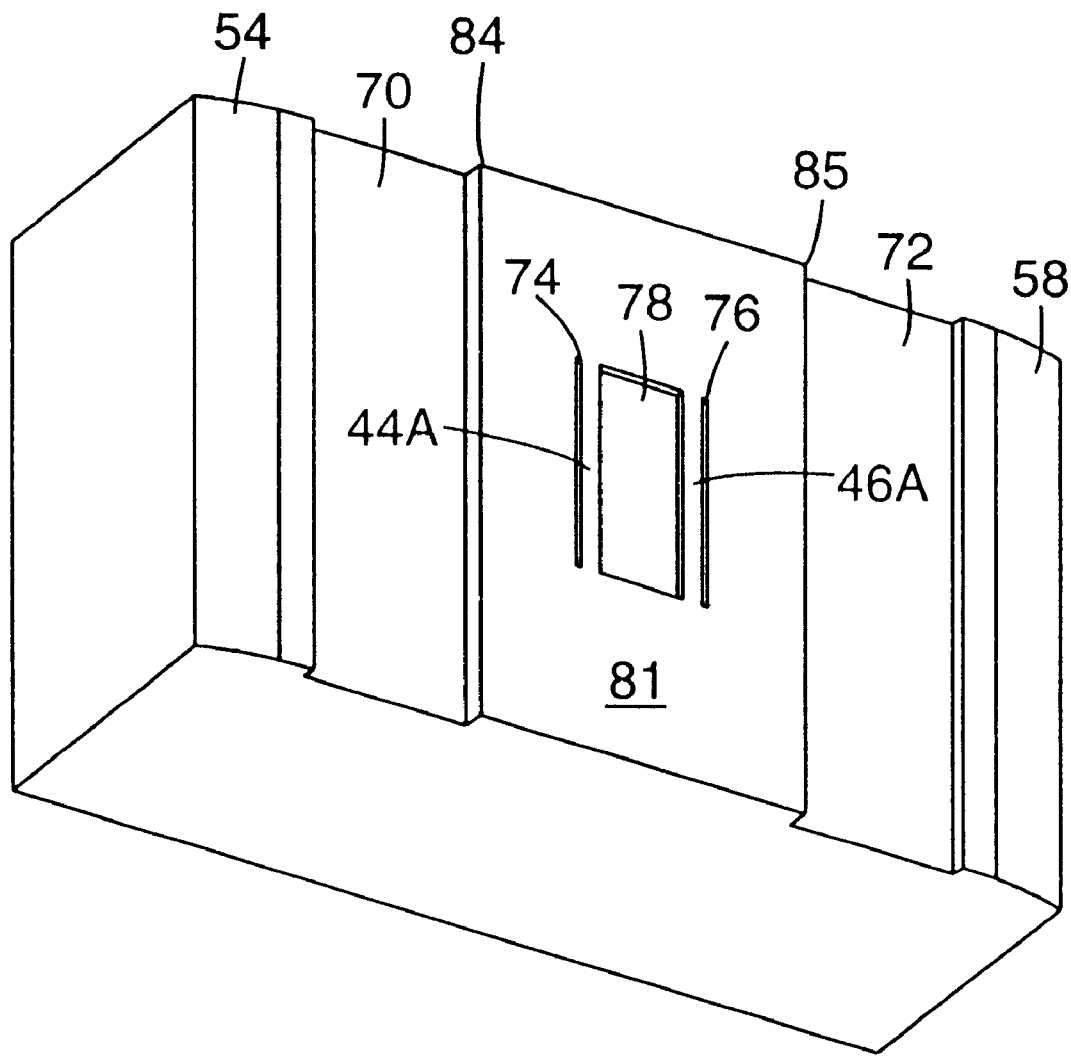
FIG. 4 is perspective view of an alternate negative pressure head contour in accordance with the present invention.

FIG. 4 is a perspective schematic illustration of the magnetic head assembly 50 of FIG. 3 without the various layers illustrated. The cavity 78 may alternately extend to the edge of the magnetic head assembly 50, as shown in FIG. 3.

Figure 5A:
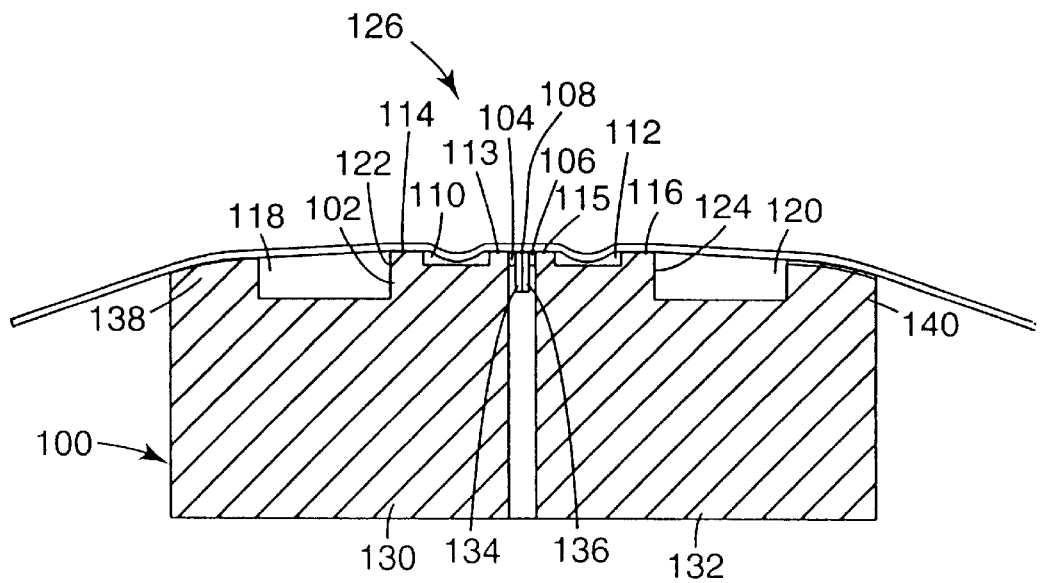
FIG. 5A is a side schematic illustration of an alternate negative pressure head contour in accordance with the present invention.

FIG. 5A is a schematic illustration of an alternate magnetic head assembly 100 in accordance with the present invention. The magnetic head assembly 100 includes a pair of substrates 130, 132 upon which are deposited read-write elements 104, 106. Closure pieces 134, 136 form an interface between the substrates 130, 132. The substrates 130, 132 include a flat regions 114, 116 adjacent to cavities 110, 112, respectively. Flat regions 113, 115 are located on the substrates 130, 132 on the opposite side of the cavities 110, 112, respectively. The closure pieces 134, 136 define a portion of a flat region 108 located between the read-write elements 104, 106. The flat regions 108, 113, 114, 115, 116 are preferably co-planar. Flat regions 114, 116 are adjacent to bleed slots 118, 120, respectively. Outriggers 138, 140 are located beyond the bleed slots 118, 120, respectively.

Figure 5B:
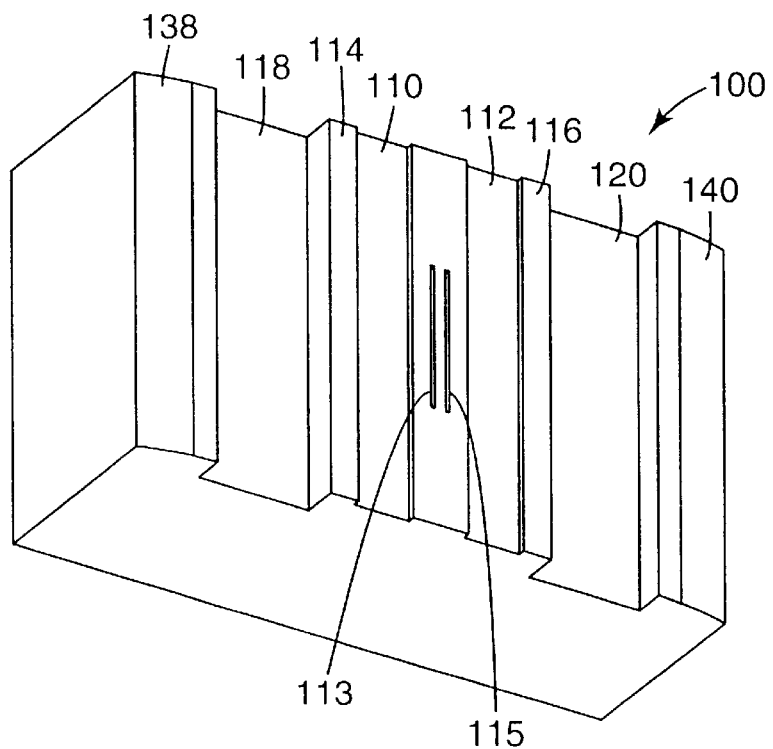
FIG. 5B is a perspective view of the alternate negative pressure head contour of FIG. 5A.

FIG. 5B is a perspective schematic illustration of the alternate magnetic head assembly 100 of FIG. 5A, without the various layers illustrated. Although the cavities 110, 112 extend to the edge of the magnetic head assembly 100, they may alternately terminate before the edge, as illustrated in FIG. 4.

In the embodiment illustrated in FIG. 5A, interface region 126 extends between edges 122 and 124 of the magnetic head assembly 100. The sub-ambient condition extends substantially across the interface region 126. As discussed in connection with FIG. 2A, the contact pressure profile in the cavity regions 110, 112 can be adjusted by adjusting the depth, width and length of the cavities. The embodiment illustrated in FIG. 5A has the advantage that the separation between the read-write elements 104, 106 can be adjusted, and preferably minimized, while still maintaining an adequate length for the cavities 110, 112, as measured along the direction of tape travel.

EXAMPLE 1

The design of the negative pressure head contour in accordance with the present invention is based upon two and three dimensional computer simulations of the head-to-tape interface. The simulation involves the numerical solutions to Reynolds equations coupled with the tape elastic equation. The results presented below are based on the elastic and surface properties of 18 gauge magnetic recording medium available in a number of Imation Corporation products, such as the Travan data cartridge. The simulated results for the head-to-tape interface were verified using a glass head with the geometry discussed below and monochromatic interferometry techniques. Interferometry can also be used to evaluate whether a particular magnetic head assembly maintains asperity contact at various pressures, tape tensions, tape speeds, etc.

The results of two dimensional simulations are for tape 7.5 micrometers thick at a tape tension of about 87.56 Newtons/meter (2 ounces per quarter of inch) and a tape speed of about 5.08 meters per second (200 inches per second). A wrap angle of about 1° with respect to the outriggers and a cavity about 1 micrometer deep were used in the simulations. The flat regions and the cavity had a length measured in the direction of tape travel of about 2 millimeters. The head-to-tape spacing was about 35 nanometers and the Reynolds pressure was sub-ambient over a large portion of the head, except in the transition zones. The negative pressure head contour was generally as illustrated in FIGS. 2A, 3 and 4.

FIG. 6A illustrates the contact pressure as a function of relative distance across the magnetic head. The horizontal axis illustrates the relative distance in the direction of the tape travel in millimeters. Tape travel is from left to right. The center, designated 0.0, is the center of the cavity. The cavity extends about 1.0 millimeter on either side of the center. The flat regions extend for about 2.0 millimeters on both sides of the cavity. The vertical axis is the contact pressure in atmospheres. The maximum contact pressure occurs in the transition zones at the leading and trailing edges of the cavity, designated −1.0 and 1.0, respectively, because the tape bends into the cavity. The maximum contact pressure also occurs at the transition zones at the outside edges of the flat regions, designated −3.0, 3.0, next to the bleed slots. The contact pressure is relatively uniform elsewhere, and especially along the flat regions containing the read-write elements.

FIG. 6B illustrates the Reynolds pressure as a function of relative distance across the magnetic head. The horizontal axis is the same as in FIG. 6A. Again, the maximum Reynolds pressure occurs at the leading and trailing edges of the two flat regions, designated −3.0, −1.0 and 1.0, 3.0, respectively.

Figure 6C:
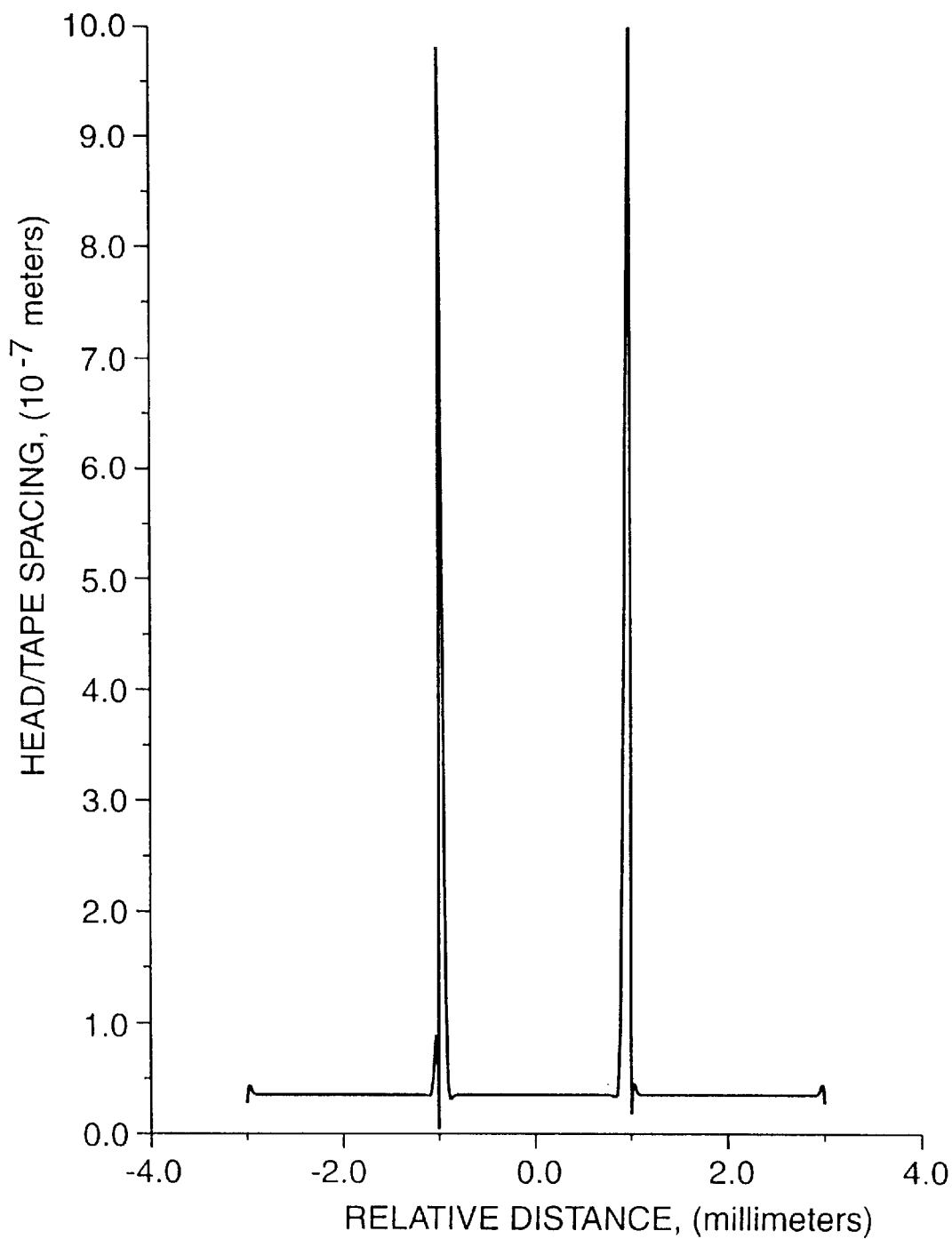
FIG. 6C is a graphical illustration of head-to-tape spacing across the length of a negative pressure head contour in accordance with the present invention.

FIG. 6C illustrates the head-to-tape spacing as a function of relative distance across the magnetic head. The horizontal axis is the same as in FIG. 6A. The vertical axis is the cavity depth in $10^{-7}$ meters. The maximum head-to-tape spacing occurs at the leading and trailing edges of the cavity, designated −1.0 and 1.0, respectively.

Figure 7:
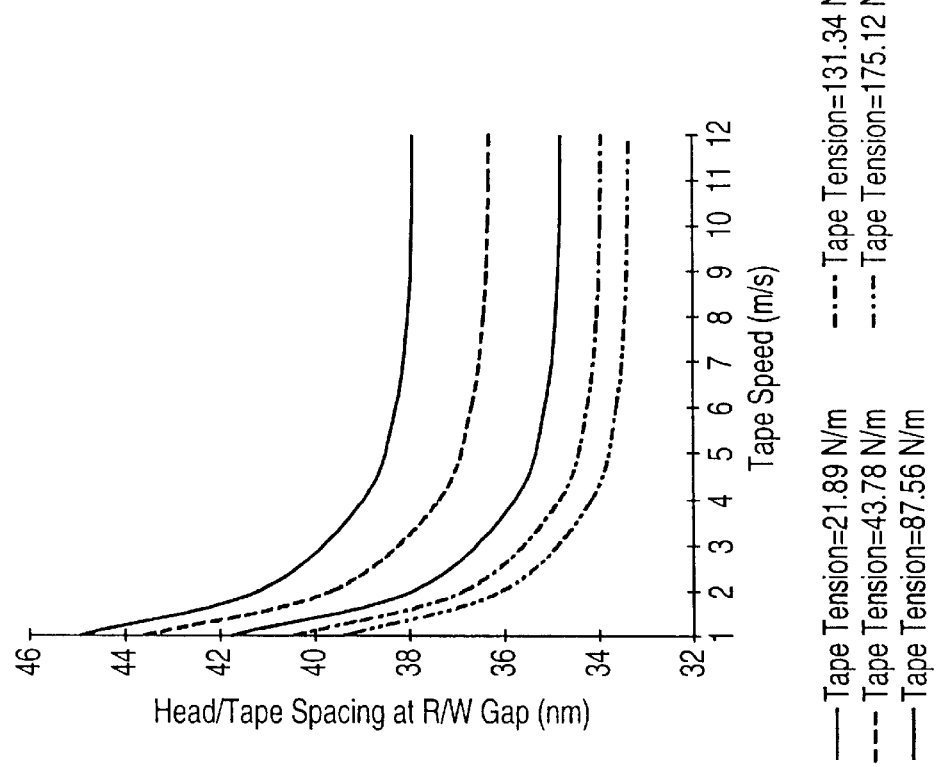
FIG. 7 is a graphical illustration of the head-to-tape spacing at the read-write gap as a function of tape speed on a negative pressure head contour in accordance with the present invention.

In order to assure a proper mechanical operation of the head in a tape drive, the analysis takes into consideration ranges of tape tension and tape speed. A typical tape tension of about 20 to about 100 Newtons per meter is considered for a tape speed of about 1 to about 10 meters per second. As illustrated in FIG. 7, the head-to-tape spacing at the read-write gap decreases with decreasing tape tension. Head-to-tape spacing decreases as tape speed increases after a tape speed of about 4 meters/second is achieved. The head-to-tape spacing at the read-write gap is less sensitive to tape speed of at least 12 meters/second.

Figure 8:
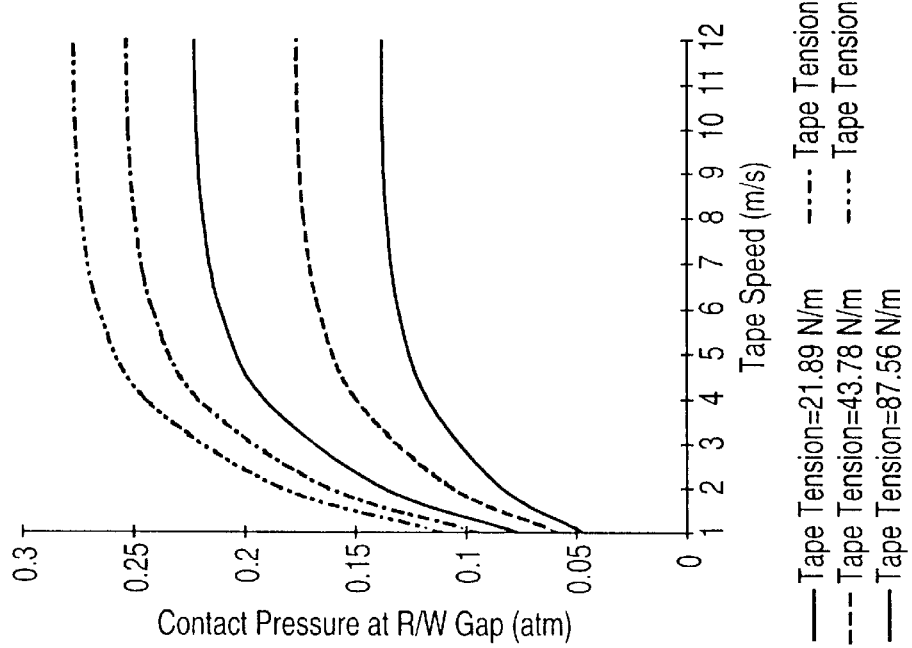
FIG. 8 is a graphical illustration of contact pressure at the read-write gaps as a function of tape speed on a negative pressure head contour in accordance with the present invention.

As illustrated in FIG. 8, the contact pressure, normalized to atmospheric pressure, at the read-write element increases with tape tension. Contact pressure at the read-write element also increases as tape speed increases. After a tape speed of about 4 meters/second is achieved, contact pressure at the read-write element is less sensitive to tape speed, to tape speeds of at least 12 meters/second.

Figure 9:
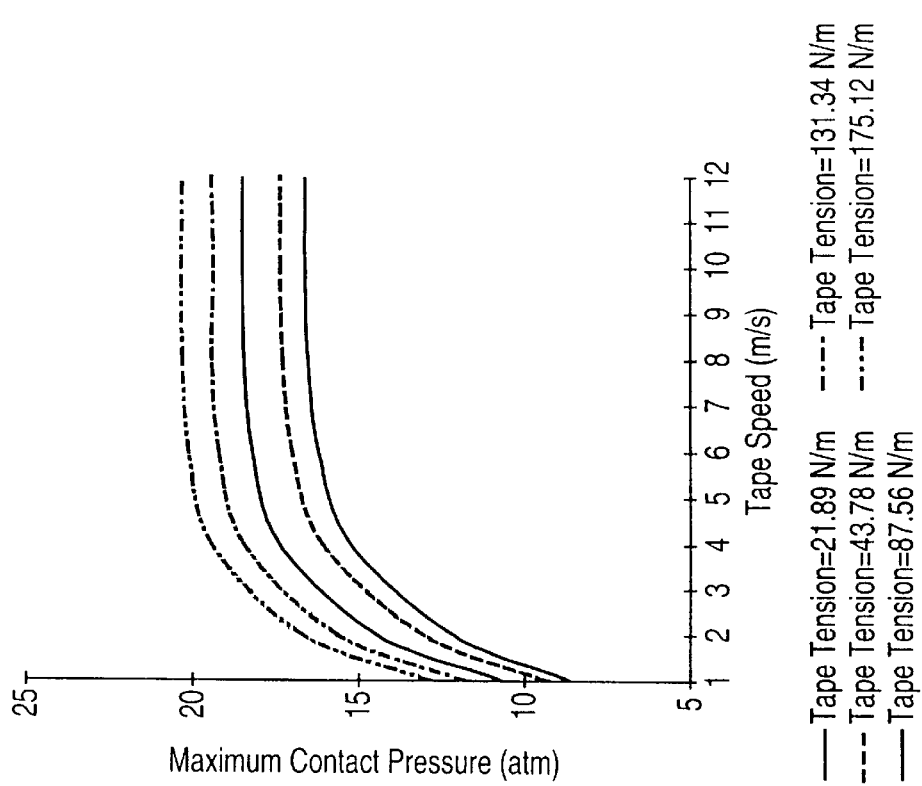
FIG. 9 is a graphical illustration of the maximum contact pressure at the read-write gaps as a function of tape speed on a negative pressure head contour in accordance with the present invention.

As illustrated in FIG. 9, maximum contact pressure increases with tape tension. However, as with head-to-tape spacing and contact pressure at the read-write element, the maximum contact pressure increases with tape speed until a tape speed of about 4 meters/second is achieved. Thereafter, maximum contact pressure is less sensitive to tape speed, even at tape speeds of at least 12 meters/second. Head-to-tape spacing at the read-write element, contact pressure at the read-write element, and maximum contact pressure stabilize at a tape speed of about 4 meters per second and are generally uniform at tapes speeds of at least 12 meters/second.

Figure 10:
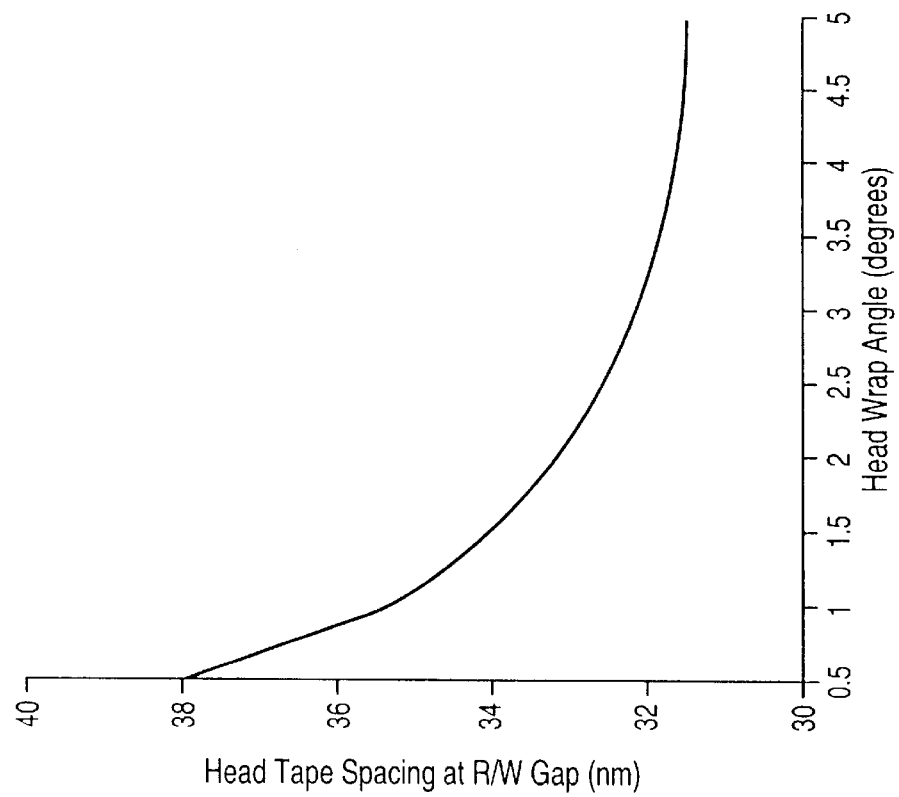
FIG. 10 is a graphical illustration of head-to-tape spacing at the readwrite gap as function of head wrap angle in a negative pressure head contour in accordance with the present invention.
Figure 12:
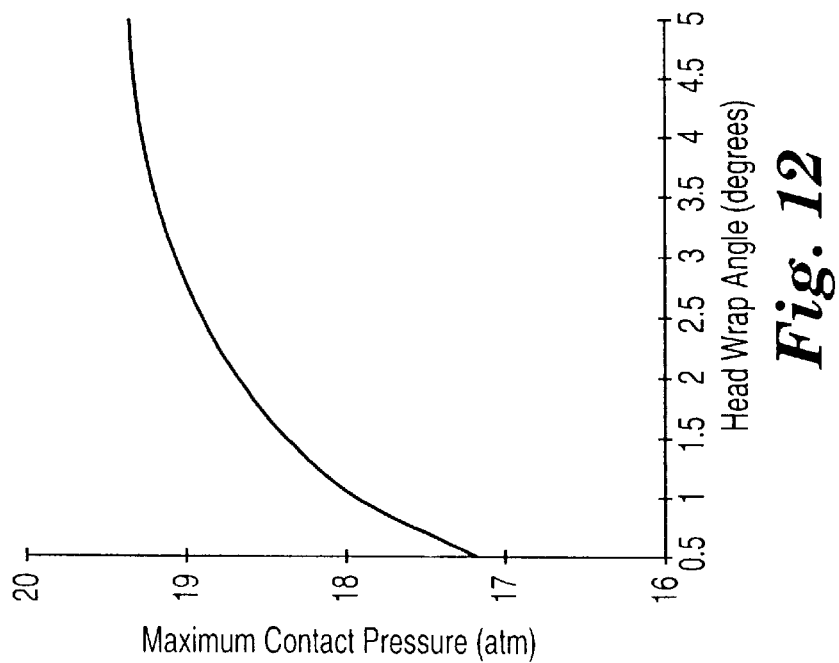
FIG. 12 is a graphical illustration of the maximum contact pressure as a function of head wrap angle in a negative pressure head contour in accordance with the present invention.
Figure 11:
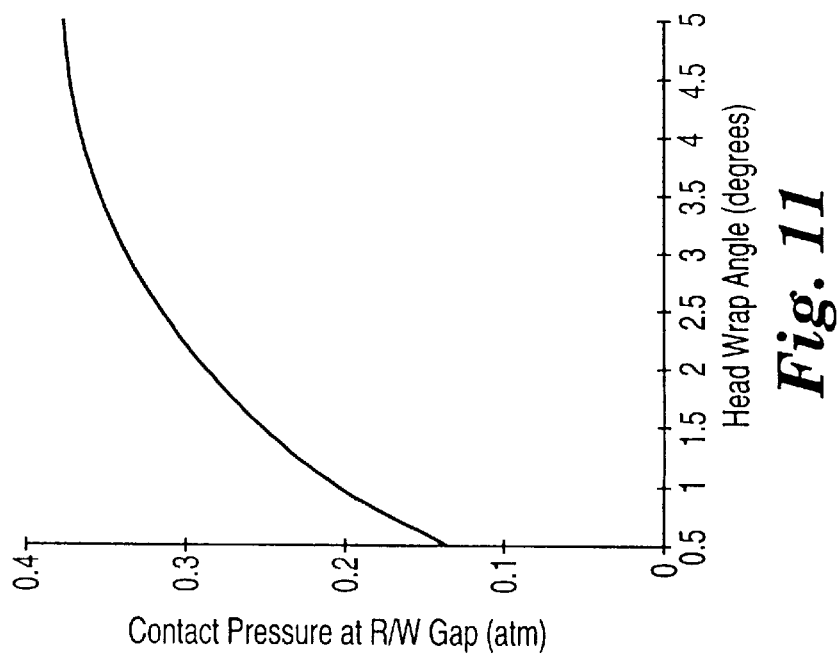
FIG. 11 is a graphical illustration of contact pressure at the read-write gap as a function of head wrap angle in a negative pressure head contour in accordance with the present invention.

FIGS. 10–12 illustrate the effect of wrap angle on head-to-tape spacing at the read-write element, contact pressure at the read-write element, and maximum contact pressure, respectively. As discussed above, the cavity depth was about 1 micrometer, the tape speed was about 5.08 meters/second and the tape tension was about 87.56 Newtons/meter. The head-to-tape spacing becomes smaller while the contact pressure and maximum contact pressure becomes slightly larger as wrap angle increases. Wrap angles beyond about 5° do not substantially improve the head-to-tape spacing, but increases the maximum contact pressure and head wear. It appears that wrap angle between about 0.5° to about 5° provides the optimal performance.

Figure 13:
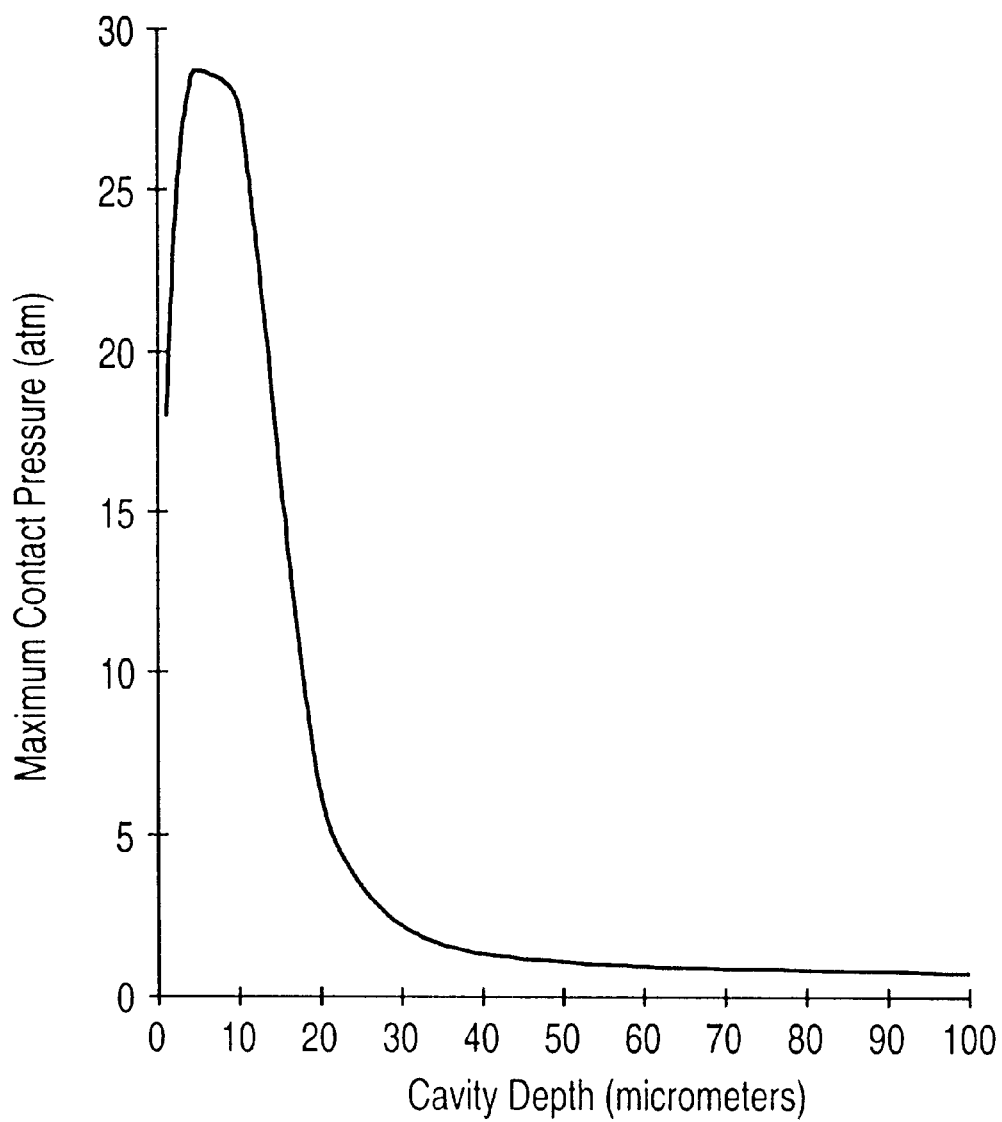
FIG. 13 is a graphical illustration of the maximum contact pressure as a function of cavity depth in a negative pressure head contour in accordance with the present invention.

The effective cavity depth on maximum contact pressure at a wrap angle of about 1°, a tape speed of about 5.08 meters/second and a tape tension of about 87.56 Newtons/meter is shown in FIG. 13. In spite of the initial rise in maximum contact pressure as a function of cavity depth, the head-to-tape spacing and the contact pressure at the element do not change substantially over a range of cavity depths of about 1 to about 5 micrometers. However, for a much deeper cavity (greater than about 10 micrometers), the overall contact pressure is reduced in the head-to-tape spacing at the read-write element becomes larger. As the cavity depth increases to about 30 micrometers, the cavity operates more like a bleed slot and the advantages of the sub-ambient condition at the read-write element are lost.

EXAMPLE 2

Example 2 relates to a design of the negative pressure head contour in accordance with the two-cavity embodiment illustrated in FIG. 5A. The data is based upon computer simulations of the head-to-tape interface. The simulation involves the numerical solutions to Reynolds equations coupled with the tape elastic equation. The results presented below are based on the elastic and surface properties of 18 gauge magnetic recording medium available in a number of Imation Corporation products, such as the Travan data cartridge.

The results of two dimensional simulations are for tape 7.5 micrometers thick at a tape tension of about 87.56 Newtons/meter (2 ounces per quarter of inch) and a tape speed of about 5.08 meters per second (200 inches per second). A wrap angle of about 1° with respect to the outriggers and a about 1.0 micrometer deep cavity were used in the simulations. The center flat region and the two cavities each had a length measured in the direction of tape travel of about 1 millimeters. The flat regions on the outside of the two cavities each had a length of about 0.5 millimeters. The head-to-tape spacing was about 43 nanometers and the Reynolds pressure was sub-ambient over a large portion of the head, except transition zones.

Figure 14B:
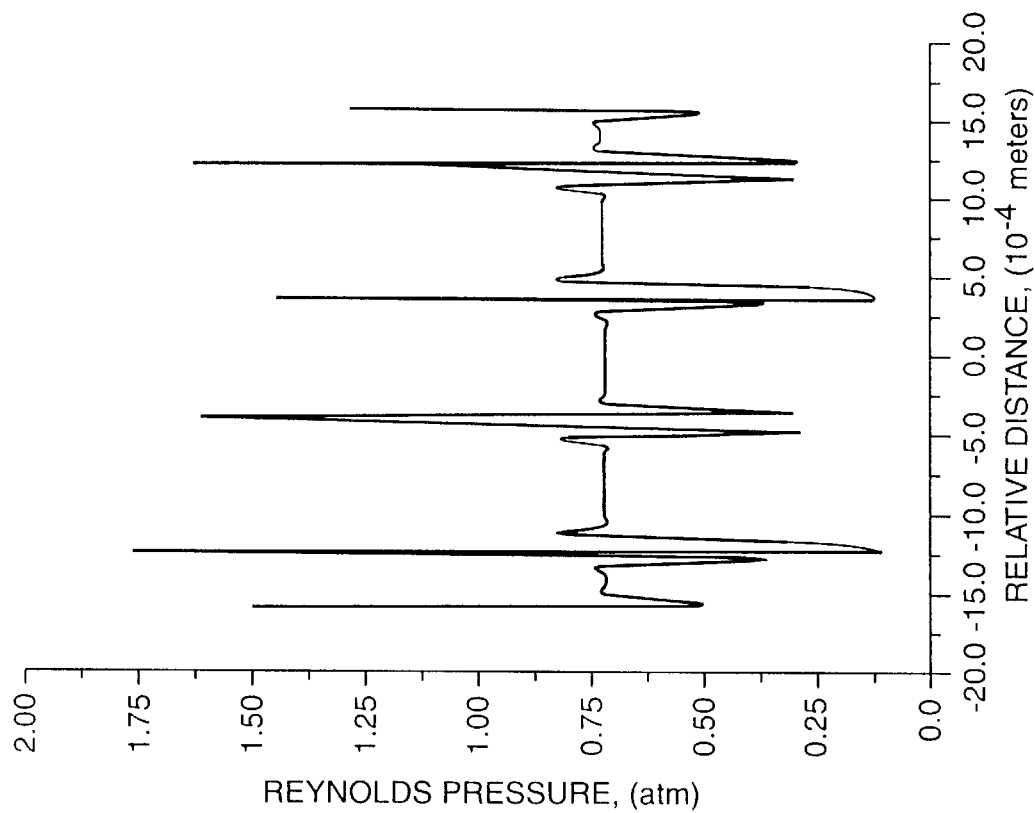
FIG. 14B is a graphical illustration of Reynolds pressure across the length of a negative pressure head contour in accordance with the present invention.
Figure 14A:
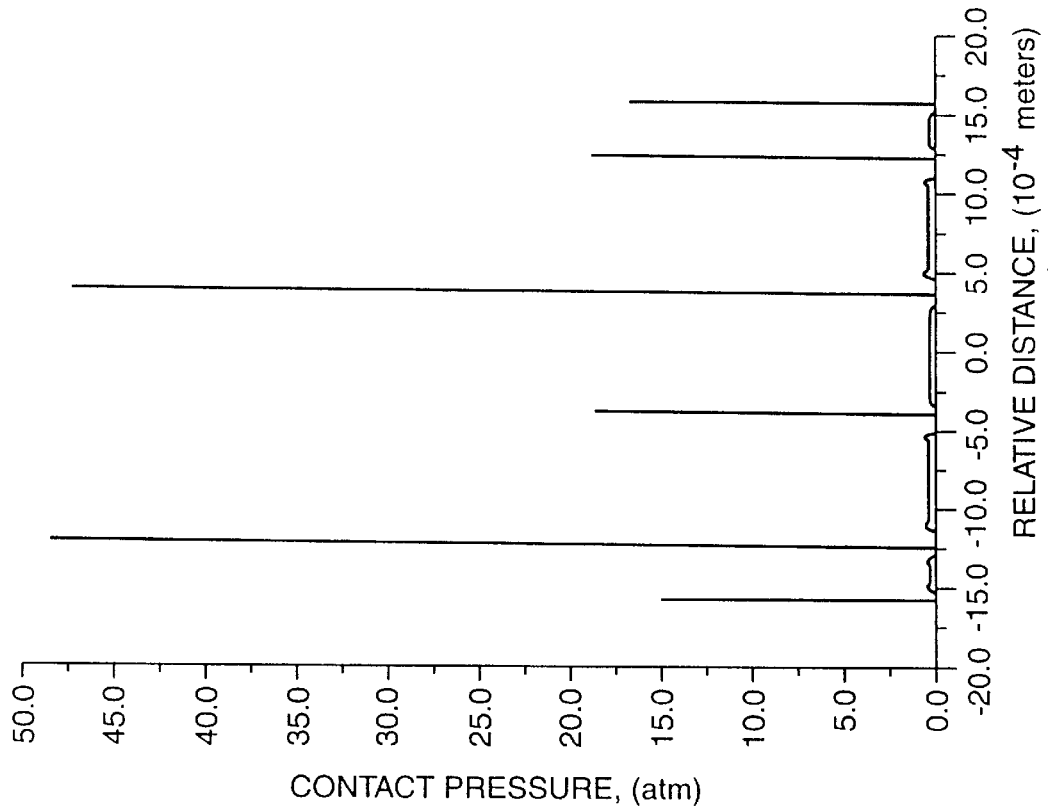
FIG. 14A is a graphical illustration of contact pressure across the length of a negative pressure head contour in accordance with the present invention.

FIG. 14A illustrates the contact pressure as a function of relative distance across the magnetic head. The horizontal axis illustrates the relative distance in the direction of the tape travel in millimeters. Tape travel is from left to right. The center, designated 0.0, is the center of the flat region containing the read-write elements. The flat region extends 0.4 millimeters on either side of the center. The cavities extend for 0.8 millimeter on both sides of the center flat region. The cavities are located at about −12.0, −4.0 and 4.0, 12.0, respectively, along the horizontal axis. The flat regions on the outside of the cavities are located at about −16.0, −12.0 and 12.0, 16.0, respectively.

The vertical axis is the contact pressure in atmospheres. The maximum contact pressure occurs at the transition zones at the leading and trailing edges of the cavities, designated −12.0, −4.0, 4.0, 12.0, respectively, because the tape bends into the cavities. The maximum contact pressure also occurs at the outside edges of the flat regions, designated −16.0, 16.0, adjacent to the bleed slots. The contact pressure is relatively uniform elsewhere, and especially along the flat regions containing the read-write elements.

FIG. 14B illustrates the Reynolds pressure as a function of relative distance across the magnetic head. The horizontal axis is the same as in FIG. 14A. The maximum Reynolds pressure occurs at the same locations as the maximum contact pressure.

Figure 14C:
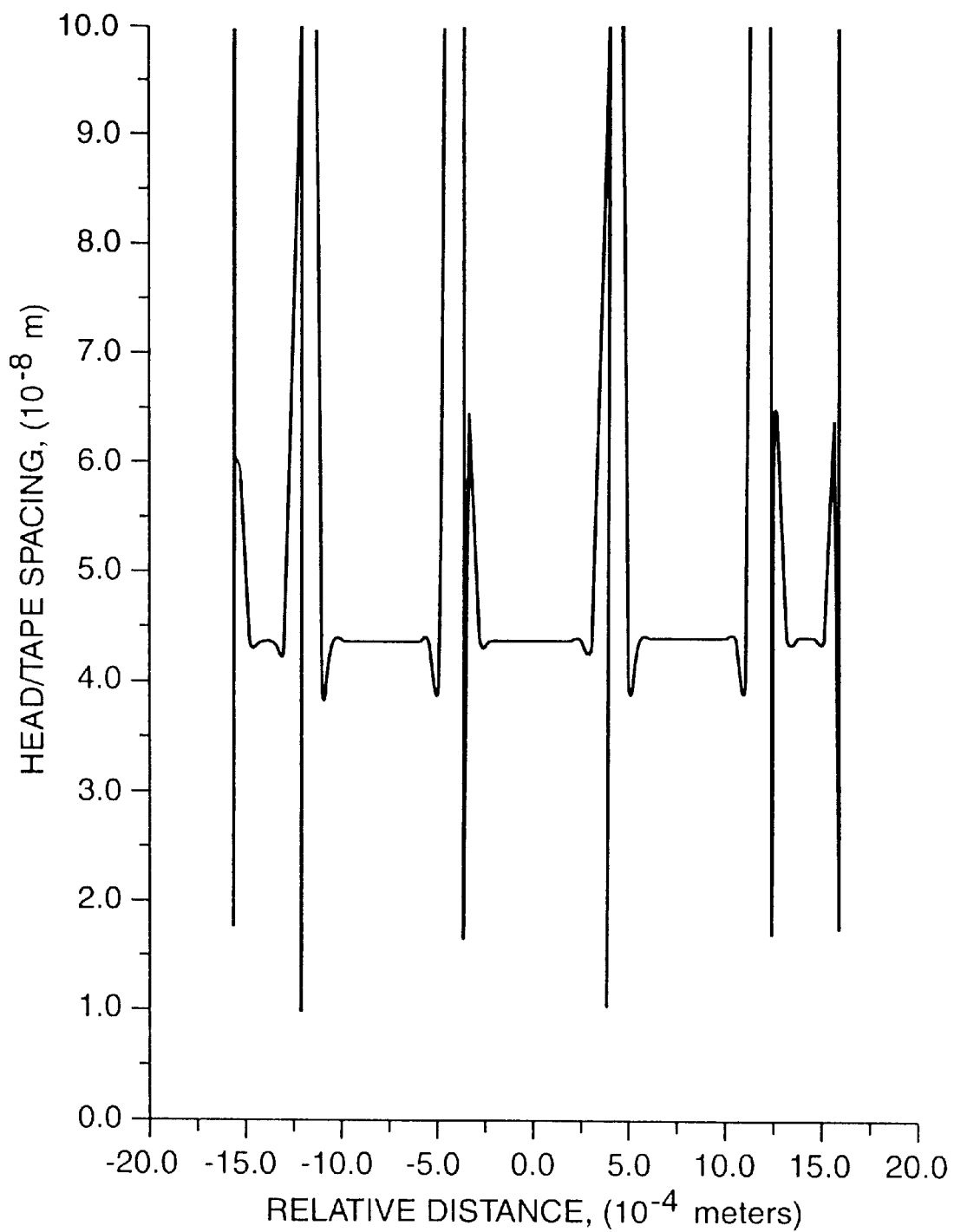
FIG. 14C is a graphical illustration of head-to-tape spacing across the length of a negative pressure head contour in accordance with the present invention.

FIG. 14C illustrates the head-to-tape spacing as a function of relative distance across the magnetic head. The horizontal axis is the same as in FIG. 14A. The vertical axis is the cavity depth in $10^7$ -meters. The maximum head-to-tape spacing occurs at the same locations as the maximum contact pressure and maximum Reynolds pressure.

The complete disclosures of all patents, patent applications, and publications are incorporated herein by reference as if individually incorporated. Various modifications and alterations of this invention will become apparent to those skilled in the art without departing from the scope and spirit of this invention, and it should be understood that this invention is not to be unduly limited to the illustrative embodiments set forth herein.

What is claimed is:

1. A magnetic head assembly in a linear tape system, comprising:

an interface region having a substantially flat region with a substantially square leading edge and at least one cavity in the flat region, the cavity having a depth of between about 0.5 micrometers and about 20 micrometers; and at least one read-write element located on the flat region adjacent to the cavity, whereby movement of a magnetic tape traversing the interface region generates a sub-ambient condition substantially across the interface region and is deformed as it passes over the cavity, thereby increasing tape stability at an interface with the read-write element.

2. The magnetic head assembly of claim 1 comprising a pair of bleed slots adjacent to the interface region.

3. The magnetic head assembly of claim 2 comprising a pair of outrigger positioned adjacent to the bleed slots for maintaining a wrap angle of less than about 5 degrees between a magnetic tape and the interface region.

4. The magnetic head assembly of claim 1 comprising at least one outrigger positioned to maintain a wrap angle of less than about 5 degrees between a magnetic tape and the magnetic head.

5. The magnetic head assembly of claim 1 further comprising a read-write element adjacent to each side of the cavity.

6. The magnetic head assembly of claim 1 comprising a pair of cavities in the flat region.

7. The magnetic head assembly of claim 6 wherein the read-write element is located on the flat region between the pair of cavities.

8. The magnetic head assembly of claim 1 wherein the leading edge comprises a material with a greater resistance to wear than the read-write elements.

9. The magnetic head assembly of claim 1 wherein the interface region comprises a flatness of less than about 100 nanometers.

10. The magnetic head assembly of claim 1 wherein the cavity comprises a length measured in a direction of tape travel of less than about 2.0 millimeters.

11. The magnetic head assembly of claim 1 wherein the flat region comprises a length measured in a direction of tape travel of less than about 2.0 millimeters.

12. The magnetic head assembly of claim 1 wherein the cavity comprises a width measured in a direction perpendicular to a direction of tape travel less than, greater than or equal to a width of a magnetic tape.

13. The magnetic head assembly of claim 1 wherein the sub-ambient condition comprises a Reynolds pressure of less than about 1 atmosphere.

14. The magnetic head assembly of claim 1 wherein the magnetic head assembly is capable of recording, reproducing and/or erasing magnetic information in the linear tape system bi-directionally.

15. The magnetic head assembly of claim 1 comprising a servo-writing magnetic head assembly.

16. The magnetic head assembly of claim 1 wherein the cavity comprises a depth of between about 0.5 micrometers and about 10 micrometers.

17. A magnetic head assembly for recording, reproducing and/or erasing magnetic information on a magnetic tape in a linear tape system, the magnetic head assembly comprising:

an interface region having a substantially flat region with a substantially square leading edge and at least one cavity in the flat region, the cavity having a depth of between about 0.5 micrometers and about 20 micrometers;

a pair of bleed slots located adjacent to the interface region;

a pair of outriggers for maintaining a wrap angle of less than about 5 degrees between a magnetic tape and the interface region; and at least one read-write element located on the flat region adjacent to the cavity, whereby movement of the magnetic tape generates a sub-ambient condition at the interface region.

18. A magnetic tape system for recording, reproducing and/or erasing magnetic information in a linear tape system, the magnetic tape system comprising:

a magnetic tape;

a magnetic head assembly comprising;

an interface region having a substantially flat region with a substantially square leading edge and at least one cavity in the flat region, the cavity having a depth of between about 0.5 micrometers and about 20 micrometers; and at least one read-write element located on the flat region adjacent to the cavity, whereby the magnetic tape traversing the interface region generates a sub-ambient condition and is deformed as it passes over the cavity, thereby increasing tape stability at an interface with the read-write element.

19. The magnetic tape system of claim 18 wherein a head-to-tape spacing at the interface with the read-write element is substantially constant at tape speeds of about 4 meters/second to at least about 12 meters/second.

20. The magnetic tape system of claim 18 wherein contact pressure of the tape at the interface with the read-write element is substantially constant at tape speeds of about 4 meters/second to at least about 12 meters/second.

21. The magnetic tape system of claim 18 wherein Reynolds pressure of the tape at the interface with the read-write element is substantially constant at tape speeds of about 4 meters/second to at least about 12 meters/second.

22. The magnetic tape system of claim 18 wherein the tape has a thickness of less than about 15 micrometers.

23. The magnetic tape system of claim 18 wherein the tape maintains asperity contact with the read-write element at tape tensions of less than about 40 Newtons/meter.

24. The magnetic tape system of claim 18 wherein the tape maintains asperity contact with the read-write element at tape tensions of less than about 40 Newtons/meter at a tape speed of at least about 4 meters/second.

25. The magnetic tape system of claim 18 wherein the tape maintains asperity contact with the read-write element at tape tensions of less than about 20 Newtons/meter at a tape speed of at least about 4 meters/second.

* * * * *